April 14, 1936.　　　　C. A. CAMPBELL　　　　2,037,117
AIR BRAKE
Filed Oct. 4, 1932　　　　3 Sheets-Sheet 1
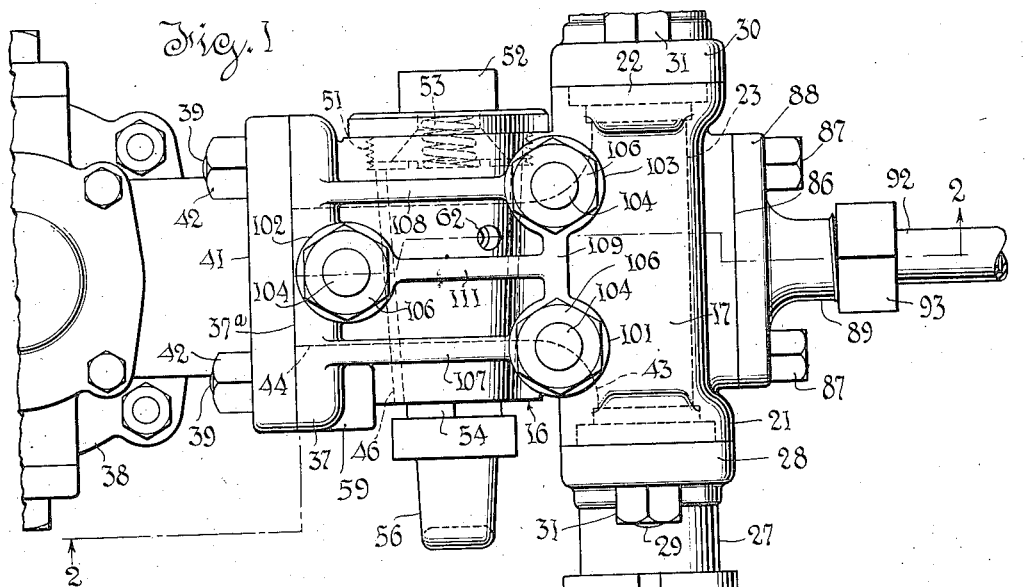
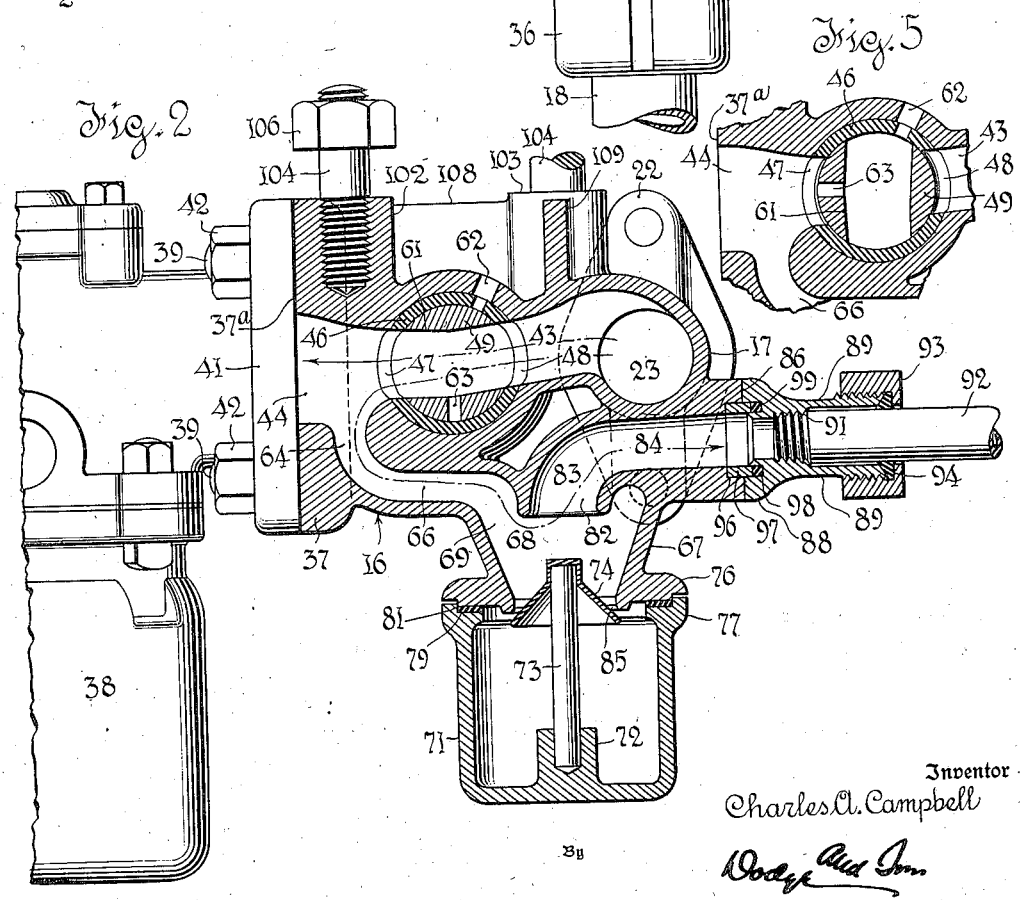
Inventor
Charles A. Campbell
By
Dodge and Son
Attorneys Inventor
Charles A. Campbell
By Dodge
Attorneys April 14, 1936. C. A. CAMPBELL 2,037,117
AIR BRAKE
Filed Oct. 4, 1932 3 Sheets-Sheet 3
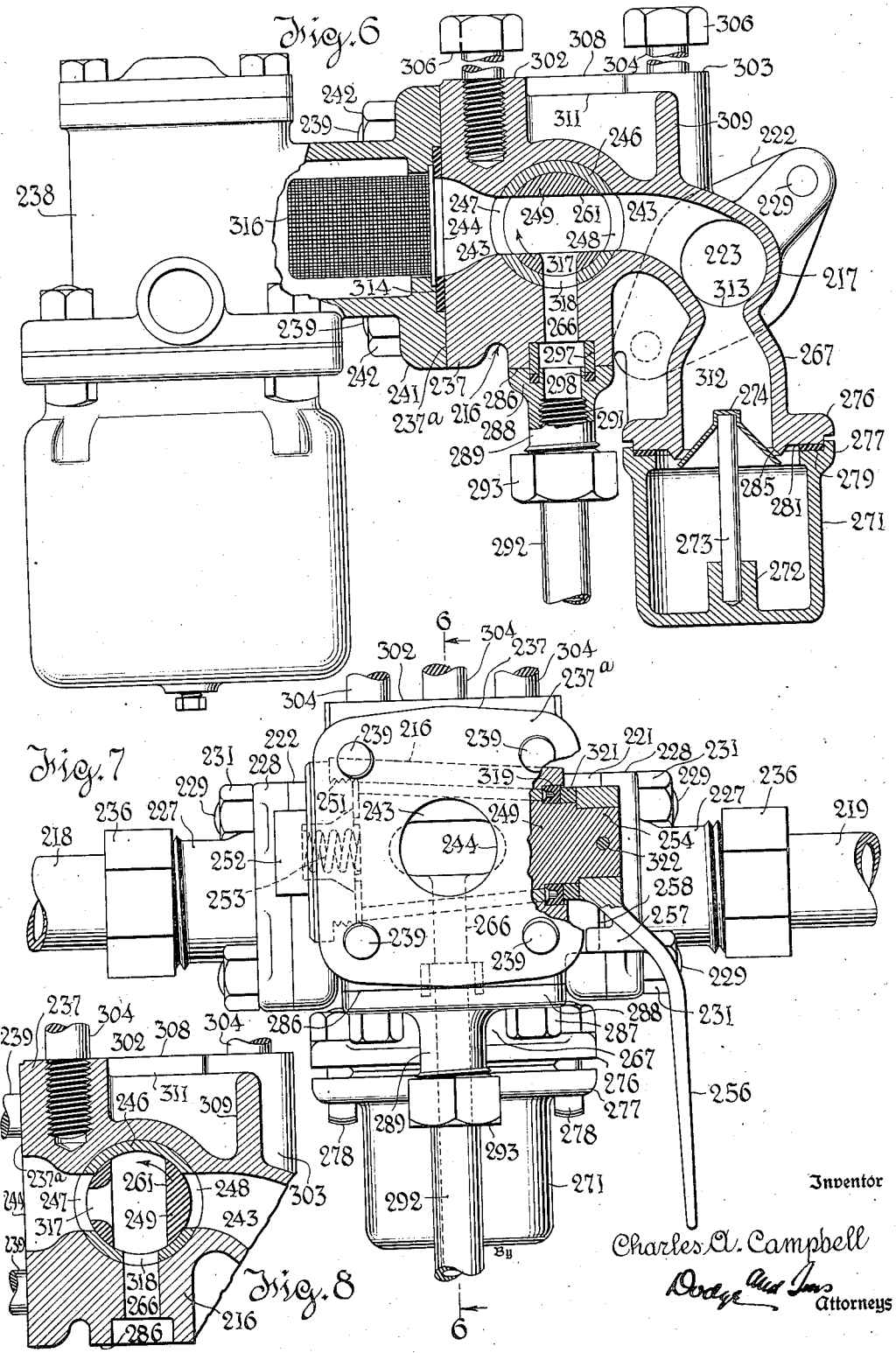
Inventor
Charles A. Campbell Patented Apr. 14, 1936

2,037,117

UNITED STATES PATENT OFFICE 2,037,117

AIR BRAKE

Charles A. Campbell, Watertown, N. Y., assignor to The New York Air Brake Company, a corporation of New Jersey Application October 4, 1932, Serial No. 636,208

19 Claims. (Cl. 303—82)

This invention relates to air brakes, and particularly to means for supporting a vent valve in direct communication with the brake pipe.

Automatic air brake systems are in process of development in which the brake pipe vent valve is constructed as a unit distinct from the triple valve. In one of these systems, to which the present invention relates, the vent valve is mounted directly on the brake pipe fitting with which connects the branch pipe leading to the triple valve. Thus, there is provided a combined vent valve mount and branch pipe fitting or T. Preferably this T has means for connecting it directly to the framing or structure of a car in order to support properly the vent valve mechanism which is of substantial weight.

With the described arrangement, action of the vent valve independently of the triple valve is insured and, because of the close proximity of the brake pipe and the vent valve, there is reduced to a minimum the interval of time lag between the brake pipe reduction and operation of the vent valve. No claim is made herein to this arrangement, since the same is fully covered by my prior application for Letters Patent, Serial No. 560,806, filed September 2, 1931 (Patent No. 1,955,871, April 24, 1934).

The vent valve structure which is connected directly to the branch pipe T is provided with means which may be manually adjusted to close the vent valve exhaust in case defective functioning of the vent valve should develop. Similarly, if defective operation in the triple valve structure should develop, a cut-out cock in the branch pipe between the branch pipe T and the triple valve may be closed, thereby nullifying the action of the triple valve unit. Hence, the triple valve and the vent valve may be cut out independently of each other.

A condition may arise where it is desirable to cut out only the vent valve. In this case, the triple valve would continue to operate in a normal manner, unless the cut-out cock in the branch pipe be closed. In order to record a defective brake in a train, it is necessary that the triple valve fail to apply. It will be evident, therefore, that a vent valve may be nullified, and yet the triple valve remain in operative condition, while no record necessarily would be made of the defectively operating vent valve. Thus, several vent valves in a train might be cut out while all of the triple valves remain operative. The danger resides in the fact that this might be carried to extremes, or to a point where the number of vent valves rendered inoperative in a single block is sufficient to cause failure of an application of the brakes.

In order to overcome this dangerous condition, it is the purpose of the present invention to supplant the separate cut-out means for the triple and vent valves with a single means for simultaneously cutting out the vent valve and the triple valve should defective operation of the vent valve develop. This single cut-out means preferably is in the form of a cut-out cock located in the branch pipe fitting between the brake pipe and the vent valve. A further object of the invention is the provision of a branch pipe fitting of the type mentioned, in which the vent valve is located in close proximity to the brake pipe, and yet sufficient room is left in the fitting for the cut-out means.

Another object is to provide for venting air from the triple valve and vent valve side of the cut-out cock when the latter is moved to closed position. This is necessary in systems employing both auxiliary and supplemental reservoirs.

Other objects include designing the air passages in the branch pipe fitting of such shape and capacity as to set up minimum resistance to air flow and thereby prevent any increase in the propagation time; providing as compact a unit as is possible with a minimum of overhang from its point of support; and simplifying the design so as to minimize the cost of manufacture.

In addition to the triple valve cut-out cock in the branch pipe in the air brake system referred to above, there also is generally inserted in the branch pipe a centrifugal dust collector to remove foreign substances from the air. Subsequent research work has developed the fact that the branch pipe may be of a very small diameter and yet satisfactory operation of the triple valve may be obtained. In decreasing the size of the branch pipe, however, difficulty is experienced in mounting the dust collector on the branch pipe line because of its substantial weight. A further object of the present invention is to provide for mounting the dust collector on the combined branch pipe fitting and vent valve mount. Mounting of the dust collector directly on the main brake pipe conduit also is contemplated, so as to intercept moisture or other foreign substances as they pass along the main brake pipe line and thereby prevent their entering the triple valve and vent valve units.

Two practical embodiments of the invention are illustrated in the accompanying drawings, in which:—

Fig. 1 is a plan view of the preferred form of the invention, showing the branch pipe fitting mounted in the brake pipe line and connected to a branch pipe, the fitting being equipped with a cut-out cock and having a vent valve mounted thereon.

Fig. 2 is a section on line 2—2 of Fig. 1, showing the dust collector, the cut-out cock in its normal, open position of Fig. 1, and the triple valve air vent closed.

Fig. 5 is a fragmentary section similar to Fig. 2, but showing the cut-out cock in closed position and the air vent open.

Fig. 6 is a section on line 6—6 of Fig. 7, disclosing a modified form of the branch pipe fitting, the cut-out cock being shown in open position.

Fig. 7 is an end elevation looking to the right relatively to Fig. 6, the vent valve having been removed for sake of clearness.

Fig. 8 is a fragmentary section, similar to Fig. 6, showing the cut-out cock moved to closed position.

Figure 3:
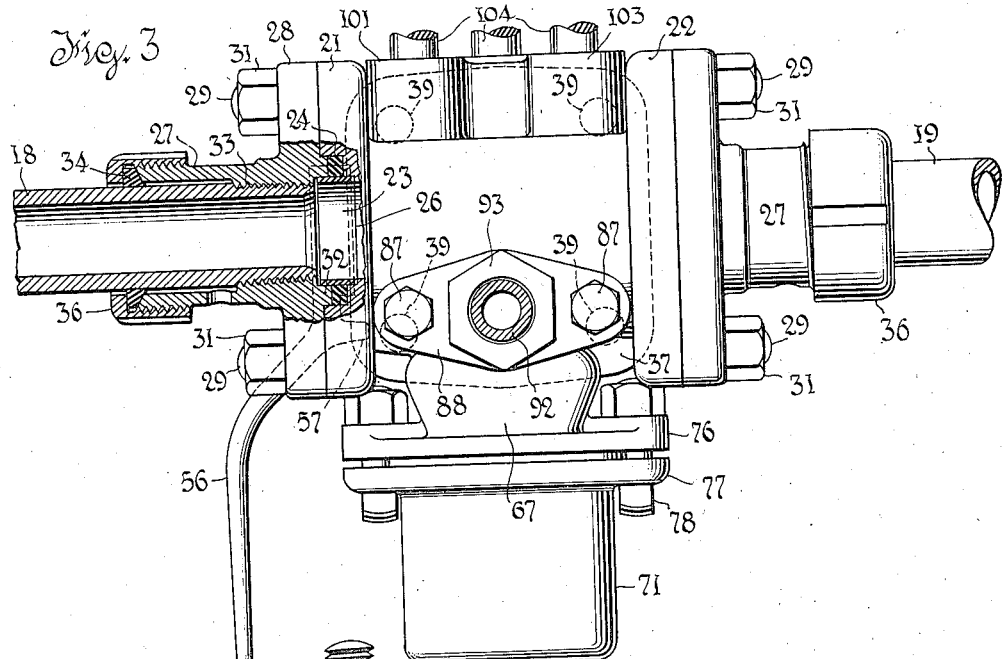
Fig. 3 is a side elevation looking to the left relatively to Fig. 1, certain parts being broken away to show the connection between the brake pipe and the branch pipe fitting.

Referring to Figs. 1 to 5 inclusive, illustrating the preferred form of the device, 16 represents the body proper of the combined branch pipe and cut-out cock fitting. At one side the body is formed with a hollow T portion 17 to the ends of which sections 18, 19 of a brake pipe are connected. End flanges 21, 22 are provided on T portion 17 to which are attached flanged union connections for securing the brake pipe ends thereto.

Each end flange 21, 22 is counterbored at the end of brake pipe passage 23 extending through T portion 17 to receive a gasket 24 and a gasket-retaining ring 26, the latter being secured in place by a press fit. A tubular, union connecting member 27 provided with a flange 28 is securely attached to flange 21 by stud bolts 29 on flange 21 which project through openings in flange 28 and receive nuts 31. An air-tight seal between flanges 21 and 28 is obtained through the compression of gasket 24 by an annular boss 32 on the inner face of flange 28.

Interiorly union member 27 is threaded at 33 for connection with the inner threaded end of the brake pipe. Union member 27 is countersunk at its outer end to receive a compression ring 34 encircling the brake pipe. A locking nut 36 threaded onto the end of union member 27 serves, when tightened, to compress ring 34 about the brake pipe and thereby prevent transmission of excessive pulling strains to the threaded connection at 33.

At its opposite side body 16 is formed integrally with a flanged portion 37 to which a vent valve unit 38 is attached. Mounting face 37a of flanged portion 37 is provided with a plurality of stud bolts 39. These project through openings in a mounting flange 41 on the vent valve unit and receive nuts 42 to secure the unit rigidly in place.

Extending centrally from brake pipe passage 23 in body 16 is an air passage 43 which leads to a port 44 communicating with the entrance to vent valve 38. Body 16 is bored out transversely of passage 43 to receive a tapered bushing 46 provided with opposed openings 47, 48 which aline with air passage 43 in the body. A cock plug 49 is ground to a close fit within bushing 46. Body 16 is threaded interiorly at 51 (Fig. 1) to receive a threaded closure plug 52. A coil spring 53 between the closure plug and cock plug 49 constantly urges the latter into sealing relationship with bushing 46.

Figure 4:
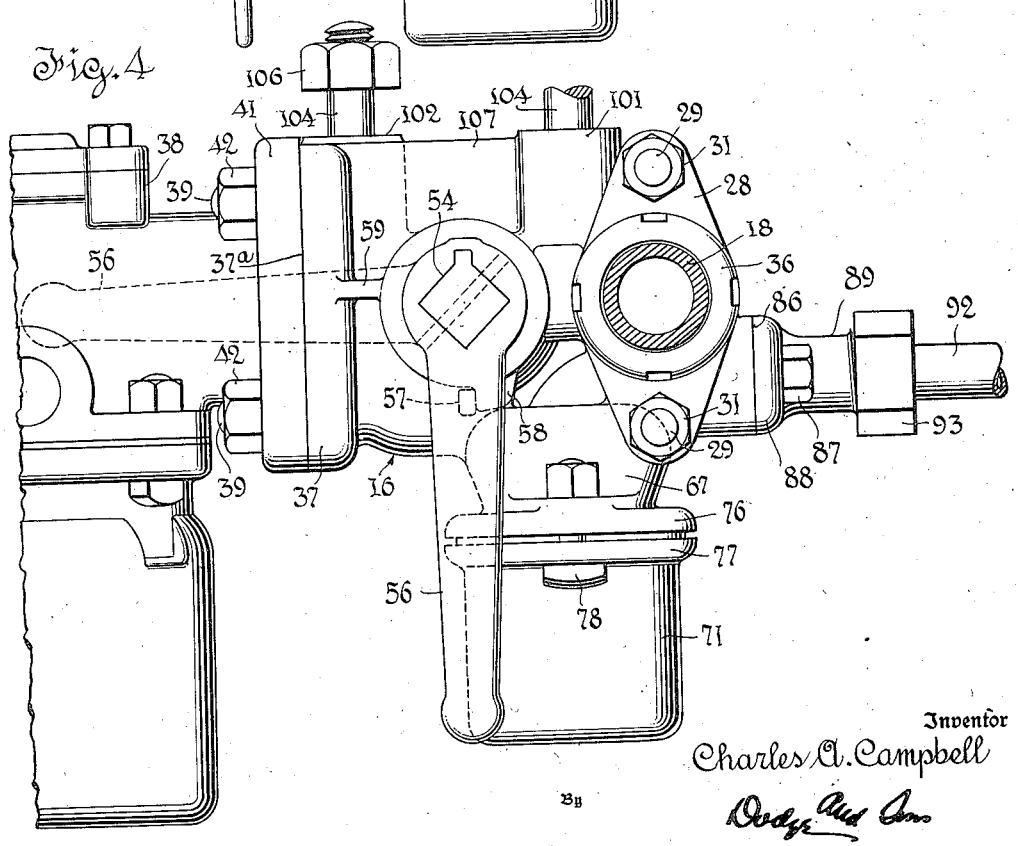
Fig. 4 is an end elevation looking in the direction of Fig. 2, the operating handle for the cut-out cock being shown in full lines in its open position and in dotted lines in its closed position.

Cock plug 49 is squared at 54 to receive an operating handle 56. A stop lug 57 on the handle and stop lugs 58, 59 on body 16 coact to limit movement of the handle in either direction and to define, respectively, the open and closed positions of the cock plug. Handle 56 is disposed in a vertical position when the cock plug is open, and in a horizontal position when the plug is closed, as indicated in Fig. 4.

Cock plug 49 has a slightly curved passage 61 extending therethrough, the ends of which are adapted to aline with openings 47, 48 in the bushing and passage 43 when the cock is in the open position of Figs. 1 to 4. When the cock plug is rotated 90° in a clockwise direction (as viewed in Fig. 2), passage 61 is moved out of alinement with passage 43 so as to prevent any flow of air from passage 23 to the opposite side of the cock plug, as shown in Fig. 5.

A vent passage 62 extends from the interior of bushing 46 to the atmosphere. When cock plug 49 is open, vent 62 is closed by the plug, as appears from Fig. 2. However, when the cock plug is moved to the closed position of Fig. 5, that portion of passage 43 on the vent valve side of the plug is vented to atmosphere by way of a second, but smaller, passage 63 in the cock plug, passage 61 and vent passage 62. The purpose of this is explained later.

Passage 43 branches off at 64 (see Fig. 2) in a comparatively wide sweep to form a smaller passage 66. A depending hollow portion 67 of body 16 provides a tapered chamber 68 into which the lower end of air passage 66 opens at 69. Body portion 67 forms the upper part of a centrifugal dust collector on the lower end of which the dust receptacle 71 of the collector is mounted. A recessed boss 72 in the bottom of receptacle 71 supports a post 73. A combined deflector and valve 74 is slidably and loosely mounted on the upper end of the post.

Body portion 67 and receptacle 71 are formed with flanges 76, 77, respectively, which are perforated to receive bolts 78, whereby the parts are securely clamped together. A gasket 79 located in a counterbore 81 in receptacle 71 insures an air-tight seal between the parts.

Body 16 is formed with a tubular portion 82 projecting downwardly into chamber 68. Passage 83 in said tubular portion communicates with a passage 84 which opens at its outer end onto a mounting face 86 for a branch pipe.

In the normal charged conditon of the system, air from the brake pipe flows through opening 69 at the lower end of passage 66, and is directed tangentially into the vortex or centrifugal chamber 68 in which the separation occurs. From this chamber the air passes off through the center exhaust passage 83 to the branch pipe and triple valve. Member 74 is free to vibrate and this jars off any dust that settles upon it, causing the dust to flow into receptacle 71. In case of an emergency reduction of brake pipe pressure, member 74 moves upwardly and seals against a seat 85. This precludes any violent reflux of air from receptacle 71, such as would tend to carry dust back into chamber 68.

Securely clamped on mounting face 86 by means of cap screws 87 extending through openings in flange 88 thereof is a union member 89. Interiorly member 89 is threaded at 91 to connect with the inner threaded end of a branch pipe 92. Branch pipe 92 leads to the usual triple valve (not shown). A union nut 93 is threaded on member 89 and coacts with a compression ring 94 to prevent pulling strains on the theads at 91. Mounting face 86 is counterbored at 96 to receive a tube 97 which projects therefrom to compress a gasket 98 located in a groove 99 in member 89 to form a tight seal between the parts.

Bosses 101, 102 and 103 are provided at the top of body 16. Each boss has a stud bolt 104 and a nut 106 whereby the fitting may be rigidly attached to a car. Reinforcing ribs 107, 108, 109 connect bosses 101 and 103 to vent valve mounting flange 37 and to each other. Another rib 111 extends from boss 102 to rib 109.

It will be evident from the above description that with the cut-out cock in its open position of Fig. 2, the emergency path of air flow is direct from the main brake pipe conduit to the vent valve, while the quick service path of flow extends through gradually curved passages to the triple valve, so that a minimum resistance to air flow therethrough is set up. The emergency air path is indicated by the upper dot-and-dash line in Fig. 2, and the quick service path by the lower dot-and-dash line. If a defective condition should develop in vent valve 38, cock plug 49 may be rotated clockwise by handle 56 from its open position of Fig. 2 to the closed position of Fig. 5, thereby cutting off communication between the brake pipe on the one hand, and the vent valve and the triple valve on the other. In this position of the cut-out cock, it is impossible to apply the triple valve by a reduction of brake pipe pressure. Therefore, when a trial brake application is made, the triple valve will not respond.
The complete brake equipment will then be recorded as defective, thus necessitating repairs upon arrival of the car at the first repair point.

As stated, air is vented to atmosphere from the vent valve and triple valve side of cock plug 49 by way of passages 63, 61 and 62 when the plug is moved to closed position. This vent is necessary in systems employing auxiliary and supplemental reservoirs in order that all air may be drained from each of the reservoirs. When the vent is opened, the triple valve moves to emergency position, whereupon the release valve may be operated to exhaust all air from both reservoirs and the brake cylinder.

An important feature of the branch pipe fitting construction described is its compactness and balanced mounting, whereby overhang of all parts of the structure relative to its point of attachment to the car is reduced to a minimum. This is accomplished to a large degree by the side by side arrangement of the cut-out cock 49 and the brake pipe connection or T portion 17 of the fitting. The three mounting studs 104, it will be noted, are arranged directly over the cut-out cock and vent valve mounting flange 37, so that a rigid support for the vent valve is provided. Two of these studs are located over the brake pipe conduit, thereby bringing the center line of balance between the brake pipe and the vent valve substantially midway between lug 102 on the left and lugs 101 and 103 on the right.

The side by side arrangement of the cock plug and brake pipe above-mentioned also permits use of a short and substantially straight passage 43 from the brake pipe to the entrance of the vent valve. This, together with the fact that air passages 23 and 43 in the fitting and passage 61 in the cock plug are of substantially the same capacity, insures maximum rapidity of brake pipe reduction when the cut-out cock is open. Air passage 43, as shown in Fig. 2, branches off from passage 23 somewhat above the bottom of the latter and slopes slightly downwardly towards port 44 leading to the vent valve. With this arrangement, any foreign substances passing through the brake pipe do not readily spill over into the vent valve.

The modification of Figs. 6, 7 and 8 contains practically all of the elements in the construction of Figs. 1 to 5. The reference numerals, however, have been increased by 200. Hence, the body proper 216 corresponds to body 16, T portion 217 to T portion 17, and so on. There are certain modifications which can be briefly described.

The particular purpose of this construction is to reduce to a minimum the resistance to quick service action in the brake pipe and the branch pipe. T portion 217, to which the ends of the brake pipe are connected, as described in connection with Figs. 1–5, is similar to the standard branch pipe T. In addition to the main brake pipe conduit 223 extending therethrough and passage 243, it is provided with another passage 312 opening at 313 into the lower part of brake pipe passage 223. Passage 312 is formed in a depending portion 267 of the T which is connected to the body of the latter intermediate the flanged ends 221, 222 thereof.

Depending portion 267 of the T is flanged at 276 to provide a ported mounting face 281 for a dust collector receptacle 271. This receptacle is constructed and mounted similarly to receptacle 71 of the form of the device illustrated in Figs. 1–5.

Within the receptacle is mounted a post 273, as in the preferred form, the post carrying a thimble or valve 274 loosely arranged on its upper end. Valve 274 is normally spaced slightly below its seat 285 so as to allow foreign substances, deposited in passage 312 from brake pipe conduit 223, to find their way into receptacle 271. However, upon a sudden reduction of fluid pressure in passage 312, such as would take place during an emergency application, valve 274 moves upwardly to seal on its seat and thus prevent disturbance of foreign substances already accumulated in the collector receptacle.

It will be noted that the modified contruction does not include the centrifugal separator feature of the construction of Figs. 1–5. In the modified arrangement, dust collector receptacle 271 with its valve 274 and passage 312 acts merely as a trap in the main brake pipe line to intercept foreign substances before they can pass into passage 243.

Flanged portion 237 of the branch pipe fitting has a vent valve 238 mounted securely thereon by studs 239 and nuts 242. A gasket 314 seals the joint between the parts, while the vent valve is protected against excessive accumulation of foreign substances by a strainer element 316.

A ported mounting face 286 for branch pipe 292 is provided on the bottom of the fitting, instead of on the side thereof, as in the preferred construction.

In Figs. 6 and 7, cock plug 249 is shown in its normal open position. At this time, passage 261 in the plug forms a continuation of passage 243 in the fitting body. This permits free passage of compressed air from the brake pipe to the vent valve by way of a direct, gradually curved passage. In order to provide for free passage of air to branch pipe 292 from the brake pipe, cock plug 249 is formed with a second passage 317 which opens at its inner end into passage 261. A corresponding port 318 in bushing 246 places passage 317 in communication with passage 266 leading to the branch pipe.

With this arrangement there is, in effect, provided a main passage, i. e., that formed by the portion of passage 243 on the brake pipe side of cock plug 249, and a pair of branch passages, i. e., passage 266 and that formed by the portion of passage 243 on the vent valve side of the cock plug. As a result, in the normal charged condition of the system, the path of air flow from main brake pipe conduit 223 is divided upon reaching cock plug 249, so that air is fed to the vent valve and to the branch pipe by separate passages. This differs from the preferred construction of Figs. 1–5, wherein all of the air, after passing completely through cock plug 49, continues through the same passage 243 and is then divided so as to flow separately to the vent valve and to the branch pipe.

Cock plug 249, as shown in Fig. 7, is of cylindrical form near its right end and body 216 is counterbored to receive a sealing gasket 319. This gasket is held in place by a washer 321 interposed between cock plug operating handle 256 and the gasket. A pin 322 secures the handle to the squared extremity 254 of the cock plug. The purpose of the cock plug seal described is to prevent leakage to the atmosphere should the cock plug become badly scored.

In the open position of cock plug 249, as shown in Figs. 6 and 7, operating handle 256 is in the vertical position of Fig. 7 with its lug 257 against stop lug 258. Should a defect develop in either the vent valve or triple valve device, both of these valves may be completely cut out of the braking system by moving handle 256 to a horizontal position so as to rotate cock plug 249 clockwise, as indicated in Fig. 6. This moves the cock plug 249 into the closed position of Fig. 8 and isolates branch pipe passage 266 and vent valve port 244 from the brake pipe portion of passage 243. Movement of handle 256 beyond the horizontal position is prevented by a stop lug (not shown) on the body 216 corresponding to stop lug 59 in Fig. 4.

By mounting the vent valve directly in the main brake pipe line as described, extremely rapid emergency action may be obtained, because of the reduction of brake pipe volume to a minimum. Were the vent valve located adjacent the triple valve, a branch pipe of large capacity would be necessary, and thus the total brake pipe volume would be increased considerably. By removing the dust collector from between the brake pipe and the triple valve device and mounting it directly in the main brake conduit, resistance to quick service action is minimized. Thus, both service and emergency action may be obtained in the most rapid manner. This is highly desirable from an operating standpoint, since actual tests have demonstrated that extreme rapidity of emergency and service action is truly essential if damaging train shocks are to be avoided during long train braking.

While several practical forms of the invention are shown and described, obviously various changes may be made therein, without departing from the spirit and scope of the invention, except as the same may be limited by the appended claims.

What is claimed is:—

1. A branch pipe fitting comprising, in combination, a ported body having a brake pipe space, a branch pipe space, and a vent valve space; adjustable means on said body for controlling flow between said branch pipe and vent valve spaces on the one hand and the brake pipe space on the other hand; and means to prevent interruption by the controlling means of communication between the brake pipe space and the vent valve space, unless communication between the brake pipe space and the branch pipe space is also cut off by the flow controlling means.

2. The combination of a brake pipe; a branch pipe leading from a triple valve; a vent valve in the form of a unit distinct from said triple valve and located in close proximity to the brake pipe; fluid conducting means connecting the vent valve and the branch pipe to the brake pipe; venting means for the triple valve; and cut-out means located in said fluid conducting means, said cut-out means being operable to isolate both the vent valve and the triple valve from the brake pipe and to actuate the venting means for the triple valve.

3. A branch pipe fitting comprising, in combination, a hollow body having a portion provided with communicating brake pipe connections and adapted to be interposed in a brake pipe line, a connection for a branch pipe, and a connection for a vent valve; and means on said hollow body for controlling flow between said branch pipe and vent valve connections on the one hand and the brake pipe connections on the other hand.

4. A branch pipe fitting comprising, in combination, a hollow body having connections for a brake pipe, a connection for a branch pipe, and a connection for a vent valve; and means on said hollow body for controlling flow between said branch pipe and vent valve connections on the one hand and the brake pipe on the other hand, the hollow body being provided with a vent for the branch pipe, said vent being controlled by the cut-out means so as to open the vent when the cut-out means are closed and to close the vent when the cut-out means are open.

5. A branch pipe fitting comprising, in combination, a hollow body having connections for a brake pipe, a connection for a branch pipe, and a connection for a vent valve; means on said hollow body for controlling flow between said branch pipe and vent valve connections on the one hand and the brake pipe on the other hand, said flow controlling means comprising a cock plug and an operating handle for moving said plug between two positions in one of which the brake pipe is isolated from the vent valve and branch pipe connections and in the other of which the flow path between the brake pipe and said vent valve and branch pipe connections is open; and limiting stops on said body to prevent movement of the cock plug beyond either of said positions.

6. The combination with a branch pipe T adapted for mounting in a brake pipe line, of a cut-out cock on the T provided with a connection for a branch pipe and a supporting connection for a vent valve, said cock controlling flow between said connections on the one hand and the brake pipe line on the other hand.

7. A branch pipe fitting, adapted for mounting in a brake pipe line, comprising in a single piece a body having brake pipe connections, a ported mounting face for a vent valve, and a branch pipe connection, said body being ported to afford a passage from said brake pipe connections to the port in said mounting face and to the branch pipe connection, and a cock plug controlling said passage and operable to isolate the brake pipe from the branch pipe and the vent valve.

8. A branch pipe fitting comprising, in combination, a stop cock body provided with a portion having communicating connections for a brake pipe and adapted to be interposed in a brake pipe line, a connection for a branch pipe, and a connection for a vent valve, said body being formed with a passage normally affording communication between the brake pipe connections and the vent valve and branch pipe connections, and a cock plug controlling said passage and operable to isolate the brake pipe from the vent valve and the branch pipe.

9. A branch pipe fitting comprising, in combination, a stop cock body provided with communicating connections for a brake pipe, a connection for a branch pipe, and a connection for a vent valve, said body being formed with a passage normally affording communication between the brake pipe connections and the vent valve and branch pipe connections, and a cock plug controlling said passage and operable to isolate the brake pipe from the vent valve and the branch pipe, said vent valve connection, said cock plug and said brake pipe connections being disposed in substantial alinement with each other, and the portion of the passage in the body between the vent valve connection, the cock plug and the brake pipe connections being substantially straight.

10. A branch pipe fitting comprising, in combination, a stock cock body provided with communicating connections for a brake pipe, a connection for a branch pipe, and a connection for a vent valve, said body being formed with a passage normally affording communication between the brake pipe connections and the vent valve and branch pipe connections; a cock plug controlling said passage and operable to isolate the brake pipe from the vent valve and the branch pipe; and supporting means on the stop cock body for attaching said body to a car, the vent valve connection, the cock plug and the brake pipe connections being disposed substantially in a single horizontal plane, and the portion of the passage in the body between the vent valve, the brake pipe connections and the cock plug being formed substantially straight to provide a direct flow path from the brake pipe to the vent valve.

11. A branch pipe fitting comprising, in combination, a stop cock body provided with communicating connections for a brake pipe, a connection for a branch pipe, and a connection for a vent valve, said body being formed with a passage normally affording communication between the brake pipe connections and the vent valve and branch pipe connections; a cock plug controlling said passage and operable to isolate the brake pipe from the vent valve and the branch pipe, said stop cock body being provided with a ported mounting face for a dust collector receptacle and also having formed integrally therewith a separating chamber for the dust collector through which extends said passage leading from the brake pipe to the branch pipe; and a valve located in said port leading to the receptacle for automatically preventing return of foreign substances to the separating chamber upon a reduction of pressure therein.

12. A branch pipe fitting comprising, in combination, a stop cock body provided with communicating connections for a brake pipe, a connection for a branch pipe, and a connection for a vent valve, said body being formed with a passage normally affording communication between the brake pipe connections and the vent valve and branch pipe connections; and a cock plug controlling said passage and operable to isolate the brake pipe from the vent valve and the branch pipe, the portion of said passage between the brake pipe connections and the vent valve connection, which is substantially straight and horizontal, joining the passage extending between said brake pipe connections above the bottom thereof to prevent foreign substances from spilling over into the vent valve.

13. A branch pipe fitting comprising, in combination, a stop cock body provided with communicating connections for a brake pipe, a connection for a branch pipe, and a connection for a vent valve, said body being formed with a passage normally affording communication between the brake pipe connections and the vent valve and branch pipe connections; a cock plug controlling said passage and operable to isolate the brake pipe from the vent valve and the branch pipe; and means provided on the stop cock body for attaching the fitting to a car body, said attaching means being arranged above the cock plug so as to locate the center line of balance between the brake pipe and the vent valve centrally of the attaching means.

14. A branch pipe fitting comprising, in combination, a stop cock body provided with communicating connections for a brake pipe, a connection for a branch pipe, and a connection for a vent valve, said body being formed with a passage normally affording communication between the brake pipe connections and the vent valve and branch pipe connections, and a cock plug controlling said passage and operable to isolate the brake pipe from the vent valve and the branch pipe, the stop cock body being provided with a ported mounting face for a dust collector receptacle, the port in said face communicating with the passage in the stop cock body on the brake pipe side of the cock plug.

15. A branch pipe fitting comprising a body having communicating connections for a brake pipe, a connection for a branch pipe, and a connection for a vent valve, said body being ported to afford a passage from the brake pipe connections to the vent valve and branch pipe connections; and a cut-out cock located in said passage intermediate the brake pipe connections and the branch pipe and vent valve connections, said body being provided with a vent for said passage on the vent valve and branch pipe side of the cock, the cock controlling said passage and said vent and being operable to isolate simultaneously the vent valve and the branch pipe from the brake pipe and to open said vent.

16. The combination of claim 15 further characterized in that said cock is provided with a passage, the cock being operable between said isolating position, in which the vent is opened by means of said passage in the cock, and in position in which the vent is closed and the passage in the cock forms a part of the passage in the body.

17. A mount for brake pipe vent valves comprising in a single piece a stop cock body, means for attaching said body to a car, a ported mounting face for a vent valve, brake pipe connections, and a branch pipe connection, said body being ported to provide a passage from the brake pipe connections to the port in said mounting face and to the branch pipe connection; and a plug cock controlling said passage and operable to isolate the brake pipe from the branch pipe and the vent valve.

18. A branch pipe fitting comprising, in combination, a ported body having a brake pipe space, a branch pipe space, and a vent valve space; adjustable means on said body for controlling flow between said branch pipe and vent valve spaces on the one hand and the brake pipe space on the other hand, said flow controlling means and said body being provided with fluid conducting passages; and movement limiting means for the flow controlling means, said passages and said limiting means being so formed and arranged that the limiting means restrict movement of the flow controlling means between an open position in which said passages afford communication between said branch pipe, vent valve and brake pipe spaces and a position in which communication is cut off between the brake pipe space and the branch pipe space whenever the flow controlling means interrupt communication between the brake pipe space and the vent valve space.

19. The combination of a brake pipe; a branch pipe leading to a triple valve; a brake pipe vent valve separate and distinct from said triple valve; fluid conducting means connecting the vent valve and the branch pipe to the brake pipe; adjustable cut-out means in said fluid conducting means for permitting communication therethrough, or for isolating the triple valve and the vent valve from the brake pipe; and means to prevent said isolation of the vent valve from the brake pipe by the cut-out means, unless said triple valve is also isolated from the brake pipe by the cut-out means.

CHARLES A. CAMPBELL.

CERTIFICATE OF CORRECTION.

Patent No. 2,037,117. April 14, 1936.

CHARLES A. CAMPBELL.

It is hereby certified that error appears in the printed specification of the above numbered patent requiring correction as follows: Page 5, first column, line 37, claim 10, for "stock" read stop; and that the said Letters Patent should be read with this correction therein that the same may conform to the record of the case in the Patent Office.

Signed and sealed this 5th day of May, A. D. 1936.

Leslie Frazer

(Seal) Acting Commissioner of Patents.